United States Patent
Hedgecock

(10) Patent No.: US 11,127,273 B1
(45) Date of Patent: Sep. 21, 2021

(54) ACOUSTIC EVENT DETECTION USING COORDINATED DATA DISSEMINATION, RETRIEVAL, AND FUSION FOR A DISTRIBUTED ARRAY OF SENSORS

(71) Applicant: V5 Systems, Inc., Fremont, CA (US)

(72) Inventor: Will Hedgecock, Nashville, TN (US)

(73) Assignee: V5 SYSTEMS, INC., Fremont, CA (US)

( * ) Notice: Subject to any disclaimer, the term of this patent is extended or adjusted under 35 U.S.C. 154(b) by 0 days.

(21) Appl. No.: 17/202,305

(22) Filed: Mar. 15, 2021

(51) Int. Cl.
| | | |
|---|---|---|
| G06F 15/16 | (2006.01) | |
| G08B 21/02 | (2006.01) | |
| G10L 25/51 | (2013.01) | |
| H04L 29/08 | (2006.01) | |

(52) U.S. Cl.
CPC .............. *G08B 21/02* (2013.01); *G10L 25/51* (2013.01); *H04L 67/12* (2013.01)

(58) Field of Classification Search
CPC .......... G08B 21/02; G10L 25/51; H04L 67/12
USPC ....................................................... 709/201
See application file for complete search history.

(56) References Cited

U.S. PATENT DOCUMENTS

| | | | | |
|---|---|---|---|---|
| 5,917,775 A * | 6/1999 | Salisbury | .................. | G01H 3/12 367/93 |
| 7,558,156 B2 * | 7/2009 | Vook | .......................... | G01S 5/28 367/127 |
| 10,540,883 B1 * | 1/2020 | Keil | .................... | G08B 13/1672 |
| 10,969,506 B1 * | 4/2021 | Noll | ......................... | G01S 7/539 |
| 2004/0100868 A1 * | 5/2004 | Patterson, Jr. | ........ | G01R 31/085 367/127 |
| 2007/0159924 A1 * | 7/2007 | Vook | .................. | G08B 13/1672 367/127 |
| 2010/0188929 A1 | 7/2010 | Kitaura | | |
| 2012/0170412 A1 * | 7/2012 | Calhoun | ............... | G01S 3/8083 367/118 |
| 2014/0095156 A1 | 4/2014 | Wolff | | |
| 2015/0177363 A1 * | 6/2015 | Hermann | .................. | G01S 5/20 367/118 |
| 2015/0180986 A1 * | 6/2015 | Bisdikian | ................ | H04W 4/02 709/204 |
| 2016/0133107 A1 | 5/2016 | Showen | | |
| 2016/0232774 A1 * | 8/2016 | Noland | .............. | G08B 21/0438 |
| 2017/0154638 A1 * | 6/2017 | Hwang | .................. | G01S 3/803 |
| 2017/0169686 A1 * | 6/2017 | Skorpik | .................... | G01S 5/18 |

(Continued)

OTHER PUBLICATIONS

Hedgecock, U.S. Appl. No. 17/197,539, filed Mar. 10, 2021, Office Action.

(Continued)

*Primary Examiner* — Zhen Y Wu
(74) *Attorney, Agent, or Firm* — Hickman Becker Bingham Ledesma LLP

(57) ABSTRACT

This disclosure sets forth a system for achieving robust acoustic event detection and source localization using a geographically distributed array of sensor nodes and a set of methods for coordinated dissemination, retrieval, and fusion of acoustic sensor data. A centralized server is programmed to passively receive succinct acoustic alerts, package alerts from multiple sensors into self-contained acoustic packages based on geographic and environmental constraints, request additional data from specific acoustic sensors, and run a localization algorithm to determine the location of the source of the acoustic event.

18 Claims, 10 Drawing Sheets

(56) References Cited

U.S. PATENT DOCUMENTS

| | | |
|---|---|---|
| 2018/0046864 A1* | 2/2018 | Flint .................. G10L 25/51 |
| 2018/0102136 A1 | 4/2018 | Ebenezer |
| 2018/0301157 A1 | 10/2018 | Gunawan |
| 2019/0162812 A1* | 5/2019 | Sloan .................. G01S 3/8083 |
| 2019/0180606 A1* | 6/2019 | Pirkle .................. H04R 3/005 |
| 2019/0347920 A1* | 11/2019 | Anderson ........... G08B 13/1672 |
| 2020/0020215 A1* | 1/2020 | Pirkle .................. H04L 69/28 |
| 2020/0278239 A1* | 9/2020 | Jax .................... G01H 3/08 |
| 2020/0381006 A1* | 12/2020 | Davis .................. G10L 19/02 |
| 2020/0402378 A1 | 12/2020 | Connell |

OTHER PUBLICATIONS

Hedgecock, U.S. Appl. No. 17/197,539, filed Mar. 10, 2021, Notice of Allowance.

Hiyane et al., "Non-Speech Sound Recognition with Microphone Array", International Workshop on Hands-Free Speech Communication, http://www.isca.speech.org/archive, Apr. 2001, 4 pages.

\* cited by examiner

| Field Type | Field Name | Example Value |
|---|---|---|
| String | Detection_ID | "12345_2142_1568358723" |
| Double | Event_GPS_Time | 1295638458723.54 |
| Float Array | Angle_of_Arrival | [0.902059, 0.138778, 0.408692] |
| String | Event_Classification | "Gunshot" |
| Float | Classification_Confidence | 0.789213 |
| Float Array | Sensor_GPS_Coordinates | [32.334137, -86.310120, 34.984001] |

| | | | | | | | | |
|---|---|---|---|---|---|---|---|---|
| Collection #1: | Alert #1 from Device #1 | Alert #1 from Device #2 | Alert #2 from Device #1 | Alert #1 from Device #3 | Alert #3 from Device #1 | Alert #2 from Device #2 | Alert #3 from Device #2 | Alert #3 from Device #3 |
| Collection #2: | Alert #1 from Device #2 | Alert #2 from Device #1 | Alert #1 from Device #3 | Alert #3 from Device #1 | Alert #2 from Device #3 | Alert #3 from Device #2 | Alert #3 from Device #3 | |
| Collection #3: | Alert #2 from Device #1 | Alert #1 from Device #3 | Alert #3 from Device #3 | Alert #3 from Device #1 | Alert #2 from Device #2 | Alert #3 from Device #2 | | |
| Collection #4: | Alert #1 from Device #3 | Alert #3 from Device #1 | Alert #2 from Device #3 | Alert #2 from Device #2 | Alert #3 from Device #2 | Alert #3 from Device #3 | | |
| Collection #5: | Alert #3 from Device #1 | Alert #2 from Device #3 | Alert #2 from Device #2 | Alert #3 from Device #2 | Alert #3 from Device #3 | | | |
| Collection #6: | Alert #2 from Device #3 | Alert #2 from Device #2 | Alert #3 from Device #2 | Alert #3 from Device #3 | | | | |
| Collection #7: | Alert #3 from Device #2 | Alert #3 from Device #2 | Alert #3 from Device #3 | | | | | |
| Collection #8: | Alert #3 from Device #2 | Alert #3 from Device #3 | | | | | | |
| Collection #9: | Alert #3 from Device #3 | | | | | | | |

FIG. 4C

| | | | | | | | | | | | |
|---|---|---|---|---|---|---|---|---|---|---|---|
| Collection #1: | Alert #1 from Device #1 | Alert #1 from Device #2 | Alert #2 from Device #1 | Alert #1 from Device #3 | Alert #3 from Device #1 | Alert #2 from Device #3 | Alert #2 from Device #2 | Alert #3 from Device #2 | Alert #3 from Device #3 | | |
| Collection #2: | Alert #1 from Device #2 | Alert #2 from Device #1 | Alert #1 from Device #3 | Alert #3 from Device #1 | Alert #2 from Device #3 | Alert #2 from Device #2 | Alert #3 from Device #2 | Alert #3 from Device #3 | | | |
| Collection #3: | Alert #2 from Device #1 | Alert #1 from Device #3 | Alert #3 from Device #1 | Alert #2 from Device #3 | Alert #2 from Device #2 | Alert #3 from Device #2 | Alert #3 from Device #3 | | | | |
| Collection #4: | Alert #1 from Device #3 | Alert #3 from Device #1 | Alert #2 from Device #3 | Alert #2 from Device #2 | Alert #3 from Device #2 | Alert #3 from Device #3 | | | | | |
| Collection #5: | Alert #3 from Device #1 | Alert #2 from Device #3 | Alert #2 from Device #2 | Alert #3 from Device #2 | Alert #3 from Device #3 | | | | | | |
| Collection #6: | Alert #2 from Device #3 | Alert #2 from Device #2 | Alert #3 from Device #2 | Alert #3 from Device #3 | | | | | | | |
| Collection #7: | Alert #2 from Device #2 | Alert #3 from Device #2 | Alert #3 from Device #3 | | | | | | | | |
| Collection #8: | Alert #3 from Device #2 | Alert #3 from Device #3 | | | | | | | | | |
| Collection #9: | Alert #3 from Device #3 | | | | | | | | | | |

| Field Type | Field Name | Example Value |
|---|---|---|
| String | Requestor_Device_ID | "12345" |
| String | Request_Command | "GSL_Data_Request" |
| String | Requested_Event_Classification | "Gunshot" |
| Double | Requested_Event_GPS_Time | 129563845872354 |
| Float Array | Requestor_GPS_Coordinates | [32.334137, -86.310120, 34.9840011] |
| Boolean | Return_Event_Audio | FALSE |

602 Receive acoustic alerts from the plurality of sensing devices through unidirectional communication links, an acoustic alert of the acoustic alerts having information related to a sensing device of the plurality of sensing devices from which the acoustic alert was received and an acoustic event detected by the sensing device, the acoustic alert being received in real time relative to detection of the acoustic event 604 Create an acoustic collection for each acoustic alert of the acoustic alerts including the acoustic alert and adding subsequently received acoustic alerts that satisfy a first set of criteria to the acoustic collection 606 Determine, in an order of acoustic collection creation, whether a specific acoustic collection of the created acoustic collections satisfies a second set of criteria for identifying a location of a specific acoustic event 608 When the specific acoustic collection is determined not to satisfy the second set of criteria, create a bidirectional communication link for the specific acoustic collection with one or more sensing devices of the plurality of sensing devices and send a request for acoustic alerts to the one or more sensing devices through the bidirectional communication link 610 When the specific acoustic collection is determined to satisfy the second set of criteria, identify the location of the specific acoustic event based on acoustic alerts in the specific acoustic collection, remove the acoustic alerts in the specific acoustic collection from other created acoustic collections, and transmit information related to the location to a client device

ACOUSTIC EVENT DETECTION USING COORDINATED DATA DISSEMINATION, RETRIEVAL, AND FUSION FOR A DISTRIBUTED ARRAY OF SENSORS

RELATED APPLICATIONS

This application is related to U.S. patent application Ser. No. 17/197,539, filed on Mar. 10, 2021, and titled "ROBUST DETECTION OF IMPULSIVE ACOUSTIC EVENT ONSETS IN AN AUDIO STREAM", the entire contents of which are incorporated by reference herein.

FIELD OF THE DISCLOSURE

The present disclosure relates to the general field of electronic digital data processing and transport, and more specifically to the field of acoustic event analysis with a distributed array of networked sensor nodes.

BACKGROUND

The use of distributed sensor arrays operating in a coordinated fashion to achieve a common goal has become commonplace in recent years, with applications including fine-grained weather forecasting, physical security and surveillance, and structural health monitoring. A notable gap in relevant technologies exists in the use of distributed sensor systems to aid in the detection or rejection of environmental acoustic events, as well as to coordinate amongst the sensors themselves to enable production of highly accurate estimates of the location of the source of an acoustic event of interest.

There exist some technologies which, using a centralized server coupled with networked sensors, include timestamping and amplitude thresholding to determine a general estimate of the location of very loud events such as gunshots or fireworks. However, components of these systems do not typically interact cooperatively, intelligently, or reactively to share fine-grained or specific information about the acoustic landscape of a geographic region at any given time. The lack of a truly cooperative system for data dissemination, retrieval, and fusion of acoustic sensor data severely constrains both the accuracy and the robustness of existing distributed acoustic sensing applications and makes them less configurable and less effective across a diverse set of sensing environments. It would be helpful to perform environmental acoustic event detection using a geographically distributed system of servers and sensors operating in a coordinated fashion to achieve intelligent data transfer and analysis.

BRIEF DESCRIPTION OF THE DRAWINGS

FIG. 3 illustrates an example acoustic alert as a message in a table format.

FIG. 4B illustrates an example process of creating acoustic collections.

FIG. 4C illustrates an example process of processing one or more acoustic collections.

FIG. 5 illustrates an example request as a message in a table format.

FIG. 6 illustrates an example process performed by an audio management system.

DETAILED DESCRIPTION

Figure 1:
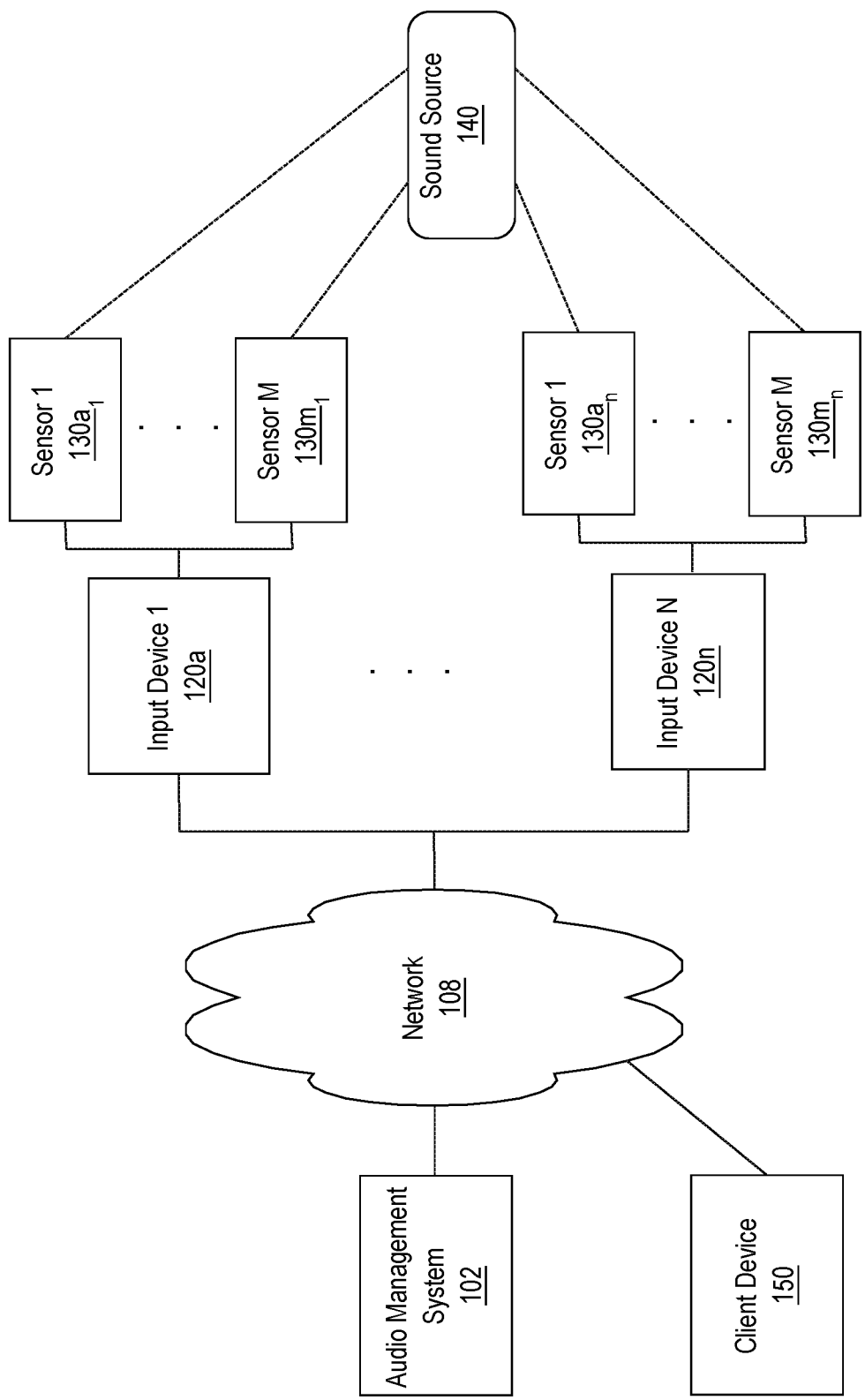
FIG. 1 illustrates an example computing environment with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

This application discloses a system that addresses the issue of detecting and localizing acoustic events of interest across a wide geographic area and in diverse, potentially noisy acoustic environments. The system prioritizes the accuracy of both event detection and event localization over the simplicity of passive, non-cooperative methodologies and aims to provide a robust solution for sharing, requesting, and retrieving acoustic data and acoustic metadata amongst a geographically distributed array of acoustic sensor nodes connected to one another through a central server.

In some embodiments, the system comprises a central, network-enabled server running a sensor fusion application. The system also comprises an interconnected system of network-enabled hardware nodes, each of which is equipped with one or more acoustic sensing nodes or apparatuses, a central processing unit (CPU), and at least one method for achieving interconnectivity, including but not limited to Ethernet, Wi-Fi, cellular, or radio transceiver. The system can be configured to perform a set of methods for requesting, receiving, replying to, and transferring acoustic data and metadata among all distributed sensor nodes and the central server. The system improves upon the detection capabilities of individual acoustic sensors by providing a framework for intelligent fusion of acoustic sensor data, metadata, and analytical results in order to more accurately detect, accept, or reject the presence of acoustic events of interest, and to accurately determine the location of the source of an acoustic event, even in the presence of line-of-sight perturbances, dispersive obstacles, background noise, multipath, and any number of other complex acoustic processes.

In some embodiments, the system operates in real-time with extremely low network bandwidth requirements by intelligently coordinating the amounts and types of data transferred across the network according to the following methodology:

1. A central server listens for incoming acoustic event alerts from one or more connected sensor nodes. An acoustic alert from a sensor node contains a minimum amount of data necessary for the central server to localize the source of the sound, including the coordinates and elevation of the sensor, a timestamp of the event, and the type of sound identified, but not including raw audio data.

2. Upon reception of an acoustic alert, the central server creates an "acoustic collection" in an acoustic collection storage structure, and starts a countdown timer, before whose expiration any additional incoming acoustic alerts from other sensors are added to the acoustic collection, if and only if the system could attribute the incoming acoustic alert to the same acoustic event as the original acoustic alert in the acoustic collection, given environmental, timing, and geometric constraints.

3. Each acoustic alert reception triggers creation of a new acoustic collection and starts a new timer, even if the acoustic alert is added to existing acoustic collections.

4. Upon expiration of the countdown timer for a given acoustic collection, the central server verifies that enough acoustic alerts have been received to execute its localization algorithm. If not, the server transmits a request for additional data corresponding to the timestamp of the original acoustic alert to all geographically similar sensors and restarts the countdown timer.

5. Upon receipt of a request for additional data, a sensor more aggressively searches through its history of raw audio data for additional potential acoustic events of interest and forwards any new results to the central server.

6. When the central server's restarted countdown timer expires again, the central server continues with the localization algorithm if enough data exists to do so, or it rejects the acoustic collection as erroneous.

7. Once an execution of the localization algorithm is complete, any acoustic alerts that were successfully utilized in that execution are barred from use in any future executions of the localization algorithm so that the same data is not used more than once.

Using the above methods, the system is able to robustly detect or reject the presence of an acoustic event, as well as produce highly accurate estimates of the location of the source of the event. The system intelligently coordinates the operation of the array of connected sensor nodes, utilizing limited network bandwidth. The system can be configured to handle many different types of acoustic events of interest, as well as to adapt to the acoustic environment in which it is operating. Moreover, the system is able to service a virtually unlimited number of distributed sensors across an unlimited geographic region without requiring additional central servers or multiple sensor fusion processes.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises an audio management system 102, a client device 150, one or more input devices 120*a*-120*n*, which are communicatively coupled directly or indirectly via one or more communication networks 118. Each of the input devices 120*a*-120*n* is coupled to one or more sensors. For example, 120*a* is coupled to 130$a_1$-130$m_1$, and 120*n* is coupled to 130$a_n$-130$m_a$. The sensors detect sounds from the sound source 140 and generate audio data.

In some embodiments, the audio management system 102 broadly represents one or more computers, virtual computing instances, and/or instances of a server-based application that is programmed or configured with data structures and/or database records that are arranged to host or execute functions including but not limited to detecting potential impulsive acoustic events from incoming audio streams and determining onset times of impulsive acoustic events. The audio management system 102 can comprise a server farm, a cloud computing platform, a parallel computer, or any other computing facility with sufficient computing power in data processing, data storage, and network communication for the above-described functions.

In some embodiments, each of the input devices 120*a*-120*n* is coupled to one or more sensors, such as 130$a_1$-130$m_1$. The sensors can be microphones to detect sounds and generate audio data. Each of the input devices 120*a*-120*n* has a size roughly no larger than the size of a desktop computer. The coupling is typically through internal embedding, direct integration, or external plugins. Therefore, the one or more sensors coupled to an input device are located relatively close to one another.

In some embodiments, the sound source 140 could be any source that produces audio, such as a gun, a human, the nature, and so on.

In some embodiments, the client devices 150 is programmed to communicate with the audio management device 102. The client device 150 is typically a desktop computer, laptop computer, tablet computer, smartphone, or wearable device.

The networks 118 may be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, when an impulsive acoustic event occurs, such as a gunshot, at the sound source 140, each of the sensors 130$a_1$-130$m_1$ through 130$a_n$-130$m_n$, to which the sound of gunshot could travel would capture the sound, generate corresponding audio data, and transmit the audio data to the audio management system 102 directly or through the input devices 120*a*-120*n*. The audio management system 102 processes the audio data generated by the sensors 130$a_1$-130$m_1$ coupled to the input device 120*a*, for example, to detect the onset of the impulsive acoustic event, namely the beginning of the impulsive event or when the gunshot occurs. Alternatively or additionally, the audio management system 102 receives from the input devices 120*a*-120*n* event data regarding the impulsive acoustic event acoustic event, such as information related to the onset or the classification of the sound, and sensor data regarding the sensors 130$a_1$-130$m_1$, such as the position or orientation of a sensor. The audio management system 102 then processes the event data and the sensor data to determine the location of the source of the impulsive acoustic event. The audio management system 102 could then send the location information and other information related to the impulsive acoustic event to the client device 150, which could be associated to law enforcement or first responders. For example, the client device could include an alarm or a system to dispatch police vehicles or a that is automatically set off or initiated by the receipt of the information sent by the audio management system 102.

3. Example Computer Components

Figure 2:
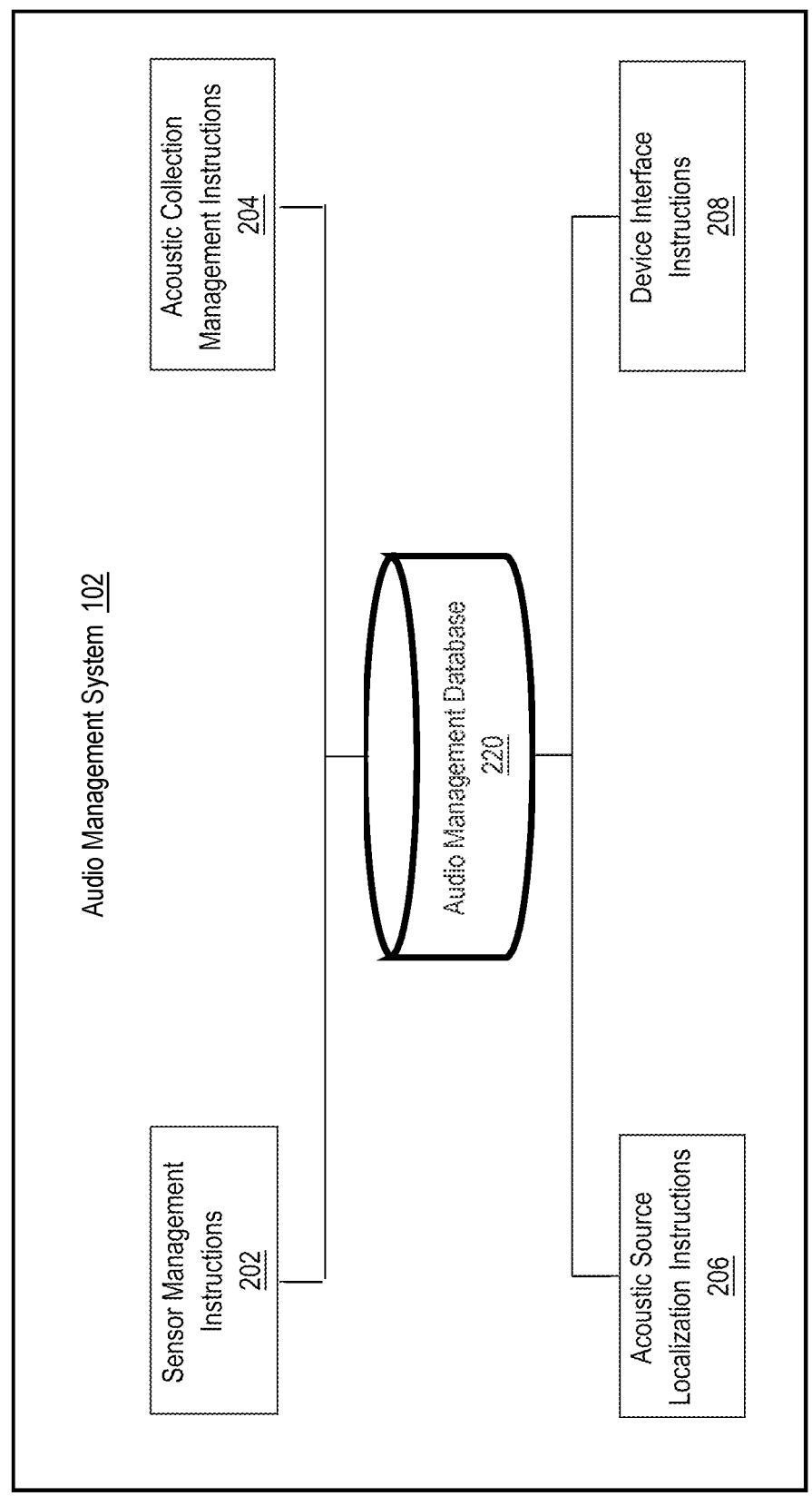
FIG. 2 illustrates example computer components of an audio management system.

FIG. 2 is shown in simplified, schematic format for purposes of illustrating a clear example and other embodiments may include more, fewer, or different elements connected in various manners. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

FIG. 2 illustrates example computer components of an audio management system. In some embodiments, the audio management system 102 comprises sensor management instructions 202, acoustic collection management instructions 204, acoustic source localization instructions 206, and device interface instructions 208. The main controller 102 also comprises am audio management database 220.

In some embodiments, the sensor management instructions 202 enable management of data related to and communication with the input devices 120*a*-120*n*. The management may comprise accessing or utilizing data related to the input devices 120*a*-120*n* or the corresponding sensors 130$a_1$-130$m_n$ in terms of function, location, and so on. The management may further comprise maintaining communication channels to send requests or receive data and responses, such as acoustic alerts of acoustic events, from the input devices 120*a*-120*n* and determining the timing for such maintenance.

In some embodiments, the acoustic collection management instructions 204 enable management of acoustic collections each associated with one or more acoustic alerts. The management may comprise maintenance data structures storing the acoustic collections and associated acoustic alerts. The management may also comprise updating the acoustic collections based on the data received from the input devices 120*a*-120*n*, the relationships among the acoustic collections, or other criteria.

In some embodiments, the acoustic source localization instructions 206 enable localization of an acoustic source of an acoustic event, such as a gunshot. The localization may comprise executing a source localization algorithm on an acoustic collection to obtain an estimated location of the acoustic source of the acoustic event.

In some embodiments, the device interface instructions 208 enable interaction with other devices, such as receiving sensor data from the input devices 120*a*-120*n* or a system corresponding to a manufacturer or an installer of any of the sensors 130$a_1$-130$m_n$, or outputting results of analyzing sensor data produced by the sensors 130*a*-130*m*, such as an estimated location of an acoustic source, to the client device 150.

In some embodiments, the audio management database 220 is programmed or configured to manage relevant data structures and store relevant data for functions performed by the audio management system 102. The data may be related to audio signals in terms of sound waveforms, transformed audio signals in the frequency domain, audio segments, frequency bins, input devices and associated sensors, common or background sounds, sounds associated with impulsive acoustic events, thresholds on acoustic properties, analytical data derived from input data and existing data, and so on.

4. Functional Descriptions

In some embodiments, the disclosed system coordinates the distribution, retrieval, packaging, and processing of sensor data from a distributed network of acoustic sensors to enable complex acoustic sensor fusion, including intelligent detection or rejection of acoustic events of interest in a user-defined geographic region, as well as carrying out high-accuracy source localization for each detected event. The distributed acoustic sensing devices comprise network-enabled microprocessors configured to detect the presence and precise onset times of transient environmental acoustic events, such as gunshots, fireworks, glass breaking, or jackhammering, using an array of one or more locally attached microphone channels per sensing device. In addition to detecting environmental acoustic events in real-time, each acoustic sensor is configured to maintain a short, fixed-length history of raw audio data from each available audio channel, where the duration of the history is configurable and may accumulate up to 10-15 seconds of historical data before being overwritten, for example.

In some embodiments, all distributed acoustic sensing devices are connected to a central server programmed to coordinate receiving and processing acoustic alerts from the distributed network, such that a source localization algorithm may be used to verify the presence and determine the geographic location of an acoustic event of interest. As the sensing devices disseminate acoustic alerts, the central server collects and packages acoustic event data from these acoustic alerts into relevant data structures, verifies the contents of each of these data structures, coordinates retrieval of additional data from the distributed network, executes a source localization algorithm, and cleans up any acoustic data structures present on the central server.

Acoustic Event Data Dissemination

Data dissemination protocols typically require a predefined methodology and format for digital communications, where the communication pathways may be unidirectional or bidirectional. Fully bidirectional protocols that involve handshaking, digital conversations, or dynamic, customizable message structures provide for increased flexibility and extensibility; however, this flexibility comes at the price of increased complexity, greater communications overhead, and higher network bandwidth requirements. Unidirectional communications protocols, on the other hand, are simpler to implement and require less bandwidth, but they are limited in the type and nature of data they are able to transmit.

In some embodiments, the disclosed system utilizes a hybrid approach for establishing communications channels, whereby the primary methodology employs only unidirectional, stateless, fixed-format message passing from any number of remotely deployed acoustic sensing devices to a single central server that is constantly listening for any such messages. In addition to this unidirectional communications framework, a bidirectional communication link may be initiated from the central server to any remote device, as discussed below. In this case, the bidirectional communication link becomes stateful, and the types and formats of messages passed between each pair of devices becomes dynamic and flexible. As soon as a bidirectional communication link is no longer required, it can be closed and deconstructed by the central server. By virtue of this hybrid nature, the general communications logic between any remote device and the central server is kept simplistic with low bandwidth until a higher-bandwidth, dynamic communication link is required for more complex messaging.

In some embodiments, in the unidirectional case, the central server opens a single network listening port on a predetermined IP address and port number and passively waits for incoming acoustic alerts to arrive from any remote unit. Since the unidirectional communication link is designed to be stateless, all data processing related to incoming acoustic alerts is handled in new computational threads subject to the availability of computing resources such that additional network messages can be continually received without waiting for completion of existing data processes. The central server stores each incoming acoustic alert in the acoustic collection storage structure, as discussed in more detail below.

In some embodiments, a remote sensing device detects a potential acoustic event of interest in its environment and determines the time when that event occurred, along with a set of optional metadata, such as a textual classification of what caused the detected sound and a confidence level in that classification. As soon as this detection process fully completes, the remote device transmits a message with a known format (e.g., bit representation) and structure (e.g., content type, data arrangement) to the central server at the server's known Internet address. No communication state is retained following the transmission, with processing logic operating as if all messages were informational in nature and successfully received at their intended destinations. The sensing device is also configured to maintain historical data related to the detected acoustic events, including the time of detection, the estimated time of onset, the time of transmitting a corresponding acoustic alert to the central server, and so on.

FIG. 3 illustrates an example acoustic alert as a message in a table format. The table has three columns, column 302 for the field type, column 304 for the field name, and column 306 for the field value. The table has multiple rows, each row corresponding to a piece of information related to the acoustic alert. In some embodiments, the transmitted message contains a limited amount of message information required for the central server to execute a localization algorithm. The message may contain the identifier or network address of the transmitting sensing device including a sensor, a unique identifier corresponding to the detected acoustic event, such as the information in row 312, geographic information about the sensor location (e.g., global positioning system (GPS) coordinates), such as the information in row 322, the orientation of the sensor with respect to the input device or the global coordinates, a high-accuracy timestamp of the onset of the acoustic event, such as information in row 314, or the incoming angle of arrival with respect to the sensor of the acoustic waveform originating at the acoustic event, such as the angle information 316. The message may also contain contextual data indicating the class of acoustic event detected, such as the class information 318, or a confidence level that the acoustic event belongs to this indicated classification, such as the confidence information 320. The class could identify a gunshot, firework, or construction noise, as discussed in U.S. Pat. No. 10,871,548 titled "Systems and methods for transient acoustic event detection, classification, and localization", for example. In other embodiments, the central server is programmed to determine or directly retrieve one or more portions of the information that may be included in this message from a database of sensors, a map of sensor locations, or other sources.

Acoustic Data Collection and Packaging

In some embodiments, the disclosed system utilizes a novel data collection and packaging scheme to cause all incoming data related to a single acoustic event to be processed together, with no individual acoustic alerts being used in a sensor fusion process more than once or in a sensor fusion process for which it is not geometrically or physically possible for the constituent acoustic alerts to correspond to the same acoustic event. The process for packaging incoming acoustic alerts performed by the central server is as follows:

1. In some embodiments, upon reception of an acoustic alert regarding a new acoustic event in the form of a data packet, the data packet is examined to ensure that its structure and format is as expected, that its contents represent logically valid data, such as latitude and longitude values corresponding to actual Earth coordinates, elevations that are consistent with real-world topologies, and timestamps that are consistent with present-day times, and that the data packet has not been previously received based on its unique identifier. A boolean utilization flag, initially set to false, is appended to the acoustic alert, indicating whether or not it has been successfully used in an acoustic localization process. This flag is referenced in a later step to determine whether an acoustic alert is available for further processing.

2. In some embodiments, when examination of the data packet is not successful, the packet is simply discarded. When examination of the data packet is successful, a new data structure called an "acoustic collection" is created which includes a reference to the incoming acoustic alert designated as the "originating acoustic alert," such as a programmatic pointer to the storage location of the acoustic alert in the acoustic collection storage structure, which allows multiple processes to see changes to fields inside the acoustic alert in real-time. This new collection can be added to the acoustic collection storage structure containing all acoustic collections yet to be processed, which can be implemented as a queue, a linked list, or another type of data structure capable of storing acoustic collections and associated acoustic alerts.

3. In some embodiments, a reference to the incoming acoustic alert is then added to all other existing acoustic collections in the acoustic collection storage structure, assuming that the incoming acoustic alert meets a number of criteria, including:
   a. The acoustic alert does not originate from the same sensing device as the originating acoustic alert of the acoustic collection. This can be determined based on the identifier or network address associated with each sensing device.
   b. The physical distance between the sensor which transmitted the incoming acoustic alert and the sensor which transmitted the originating acoustic alert, as calculated using the reported geographical coordinates of the two sensors, is less than a configurable threshold distance above which acoustic events are unlikely to be perceptible to both sensors, such as one kilometer.
   c. The time difference of arrival between the acoustic event indicated in the originating acoustic alert and the acoustic event indicated in the incoming acoustic alert is less than or equal to an amount of time calculated by dividing the actual distance (e.g., based on GPS coordinates) between the devices by the ideal speed of sound.
   d. The acoustic collection must contain a mutex lock that has not yet been acquired by a localization process.

4. At least some of the criteria above help ensure that the acoustic alerts referenced in the same acoustic collection correspond to the same acoustic event. In some embodiments, when the acoustic alert is not a bidirectional response message to a request for additional sensor information, as discussed below, and it was not already referenced by any existing acoustic collections before Step 3 above, this acoustic alert is deemed to correspond to a new acoustic event. A boolean novelty flag is then set to true in the acoustic collection created in Step 2 above, allowing the central server to request additional remote sensor data, if necessary, as also discussed below. If the alert was already referenced in an existing acoustic collection, this novelty flag is set to false.

5. A new thread is created to process the newly created acoustic collection. The new thread can be created as soon as the acoustic collection is added to the acoustic collection storage structure. A waiting period, such as three seconds, can then be started as soon as the new thread is created. This waiting period allows additional data from other remote sensors to be received and added to the current acoustic collection before event source localization begins.

Following the above methodology, the central server stores one acoustic collection per unique incoming acoustic alert into its acoustic collection storage structure, where each acoustic collection in the acoustic collection storage structure contains references to all received acoustic alerts that may potentially relate to the acoustic event in its originating acoustic alert. As such, each incoming acoustic alert has the opportunity to be treated as an originating alert. In addition, all possible groupings of related acoustic alerts may exist as acoustic collections, while no duplicate acoustic collections are maintained. Moreover, each acoustic collection contains only data that is potentially relevant to its originating acoustic alert.

Data Verification and Active Sensor Data Retrieval

In some embodiments, upon expiration of the waiting period for an acoustic collection, which occurs in the order that the originating acoustic alerts were received, the central server first checks whether the originating acoustic alert of the acoustic collection has already been successfully utilized in an acoustic localization process based on its utilization flag noted above. If the original acoustic alert has been successfully utilized, then the current collection is removed from the acoustic collection storage structure, and no further processing is performed on this collection. This could happen when the originating acoustic alert was not the originating acoustic alert in a previously created acoustic collection. If the originating acoustic alert has not been successfully utilized, then all other constituent acoustic alerts are checked to determine that they have also not been used in another localization process, and any already-used acoustic alerts are removed from the acoustic collection.

Figure 4A:
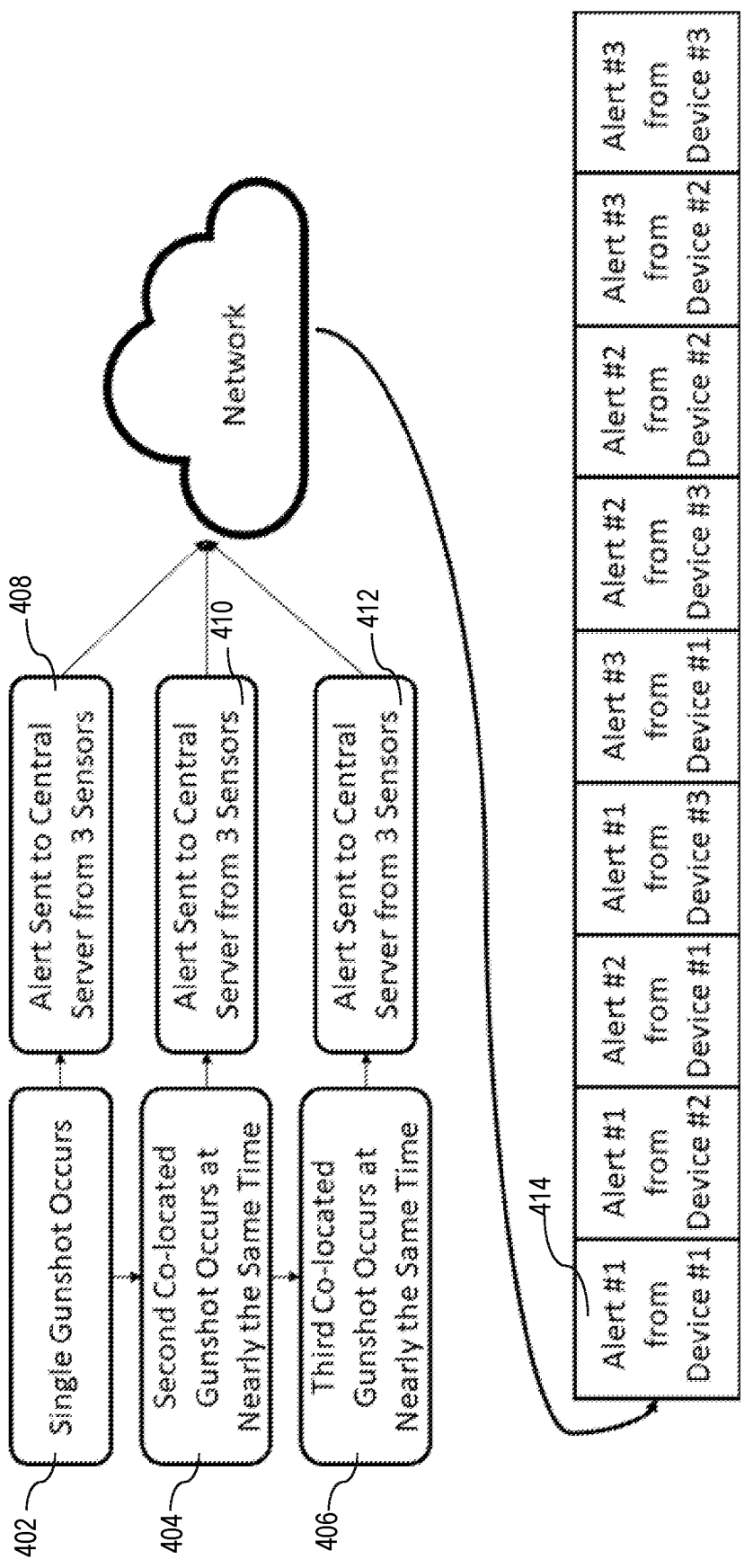
FIG. 4A illustrates an example process of receiving acoustic alerts.

FIG. 4 illustrates an example process of creating and processing acoustic collections. FIG. 4A illustrates an example process of receiving acoustic alerts. This figure depicts the order of events that transpire when multiple acoustic events of interest occur nearly simultaneously and in nearly the same location with three sensors coupled to an input device in the vicinity detecting each acoustic event. In this example, three gunshots occur in quick succession from the same source or sources that are nearby to one another, as illustrated in steps 402, 404, and 406. The three sensor devices each detect each of the three gunshots and send an acoustic alert to the central server for each of the three gunshots, as illustrated in steps 408, 410, and 412. Upon receiving the acoustic alerts, the central server stores data related to the acoustic alerts to a data structure, such as the list 414, in the acoustic collection storage structure. The acoustic alerts may not be received in the order in which the acoustic alerts were sent or the order in which the corresponding acoustic events occurred. Network delays or differing disturbances in the paths between the source and the sensing devices may affect the received order.

FIG. 4B illustrates an example process of creating acoustic collections. Based on the received order of acoustic alerts, the central server stores nine acoustic collections in the acoustic collection storage structure, such as the table 420, where each row corresponds to an acoustic collection of acoustic alerts and the first acoustic alert within each acoustic collection is considered as the originating acoustic alert.

FIG. 4C illustrates an example process of processing one or more acoustic collections. Upon expiration of the timer for the first acoustic collection, the acoustic alerts within the collection are subject to a source localization process. The circling of an acoustic alert, such as the circling 432, indicates that the acoustic alert contributes to the acoustic source location estimate. Once an acoustic alert is utilized in a source localization process for one acoustic collection, the acoustic alert is removed from all other acoustic collections. The crossing-out of an acoustic alert, such as the crossing-out 434, indicates that the acoustic alert is removed from the acoustic collection to which it belongs. Upon expiration of the timer for the second acoustic collection, it is determined that the originating acoustic alert of the second acoustic collection was already used in a source localization process, so the second acoustic collection is removed from the acoustic collection storage structure and no further processing occurs.

Figure 4D:
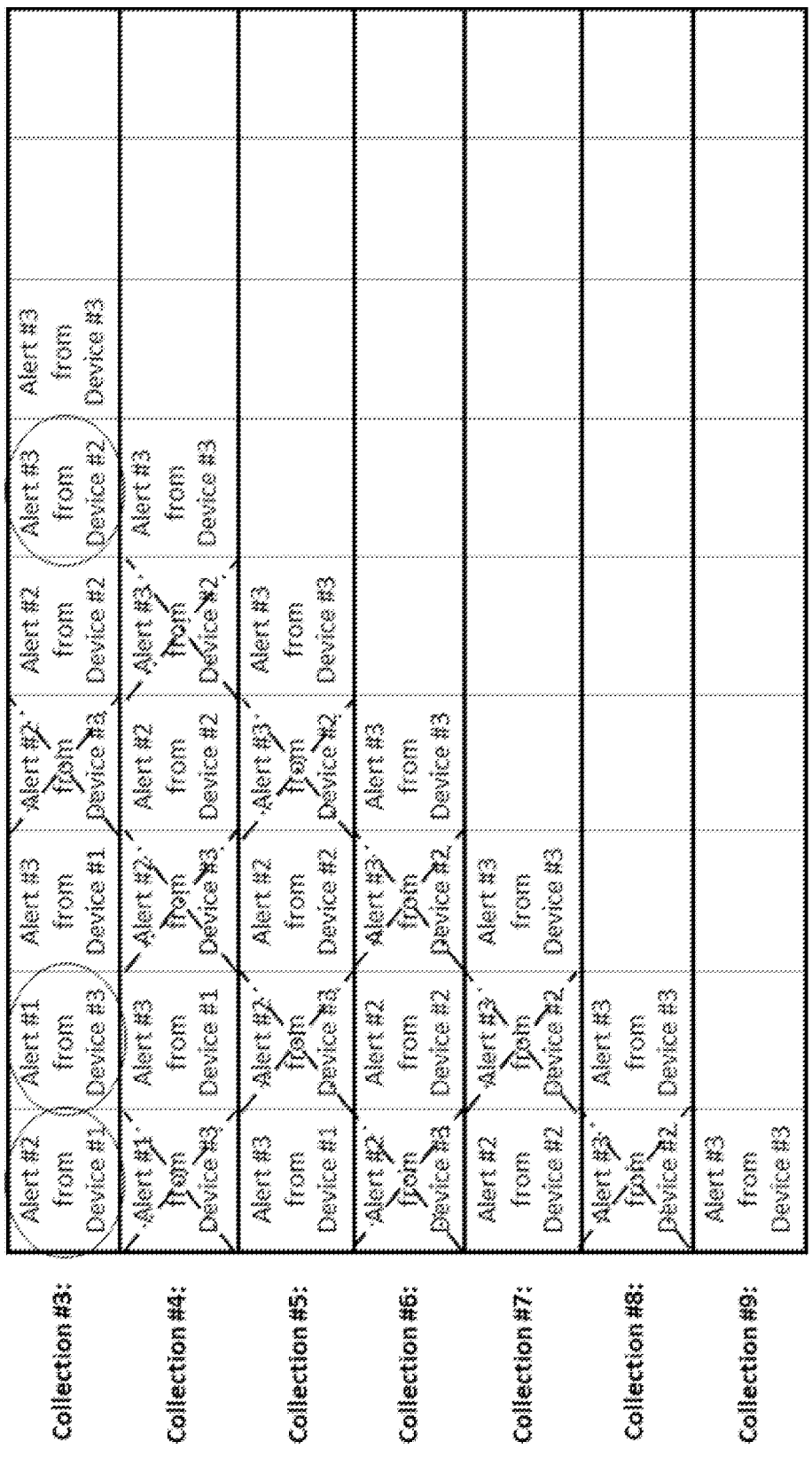
FIG. 4D illustrates an example process of further processing one or more acoustic collections.

FIG. 4D illustrates an example process of further processing one or more acoustic collections. Upon expiration of the timer for the third acoustic collection, the acoustic alerts in the third acoustic collection which were not already used in a source localization process, such as those that are not shown as being crossed out in the corresponding row of the table 420, are used to carry out another source localization process. The circled acoustic alerts in the third acoustic collection contributed to the acoustic source location estimate for the third acoustic collection. These acoustic alerts are subsequently removed from use in all future acoustic collections.

In some embodiments, the number of acoustic alerts remaining inside the current acoustic collection is determined. When the number is above a certain threshold, as required by the acoustic source localization algorithm used, acoustic source localization is performed, as discussed below. When the number is not above this certain threshold, the central server checks whether the acoustic collection's novelty flag is set that allows requests for additional sensor data. When the novelty flag is set, the central server retrieves a list of remote sensors from an internal or external database which are within a configurable threshold distance of the sensor that transmitted the originating acoustic alert of the acoustic collection. The central server then creates a bidirectional communication link to each of the retrieved remote sensors and transmits through each bidirectional transmission link a request for additional sensor data.

FIG. 5 illustrates an example request as a message in a table format. The table has three columns, column 502 for the field type, column 504 for the field name, and column 506 for the field value. The table has multiple rows, each row corresponding to a feature of the data being requested. In some embodiments, the request can include the ID of the sensor device to which the request is being sent, such as the information in row 512, a command indicating the nature of the request, such as the information in row 514, the classification of the acoustic event of interest, such as the information in row 516, the approximate detection time of the acoustic event of interest, such as the information in row 518, the location of the sensor device, such as the information in row 520, or an indication of whether actual audio data needs to be included with a reply to the request, such as the information in row 522. This request is transmitted to all remote sensors that were identified as being in the vicinity of the sensor that transmitted the original acoustic alert. A new timer is then started for a second waiting period, such as two seconds, for the current acoustic collection to allow the remote sensors to respond to the request for additional sensor data. The length of the second waiting period may be different for different acoustic collections.

In some embodiments, upon reception by a remote sensor of a request for additional sensor data as an incoming message in the form of a data packet, a receiving sensor extracts information regarding the acoustic event of interest from the incoming message, such as the timestamp of the estimated onset. The sensor then searches through historical data maintained by the sensor for any detected acoustic events that were estimated to start within a geometrically feasible time period around this timestamp, as calculated by dividing the distance between this sensor and the originating sensor by the speed of sound. When one or more detected acoustic events of any type are found but no acoustic alerts for these acoustic events were originally sent to the central server, due, for example, to their being classified as an unrelated or uninteresting type of sound, the sensor transmits certain data regarding all such acoustic events to the central server as a response to the sensor data request. The format of this response may be identical to the format of an acoustic alert. The central server is able to match this response to the original request by virtue of it being sent over a unique, request- and sensor-specific bidirectional link initiated by the central server for purposes of this communication. The contents of the response may be parsed and added to the acoustic collection following the same methodology used to add unidirectional acoustic alerts to an acoustic collection. In certain embodiments, the response to a request for additional sensor data is not used to create a new acoustic collection and may only be added to the acoustic collection for which it was requested.

In some embodiments, when no detected acoustic event is found, the raw audio around the indicated timestamp, such as within the same geometrically feasible time period noted above, is subjected to an aggressive search algorithm to identify any acoustic events from that raw audio with less specificity and a greater tolerance of error. For example, events that were ignored as being too quiet with respect to the environmental noise level may be reexamined. Statistical thresholds initially used in detecting acoustic events may be lowered such that ambiguous events are allowed to pass through the filter. If event classification is carried out, events deemed to be in the wrong class but have valid onset timings may be returned as additional data.

Any such data regarding newly identified acoustic events are then transmitted to the central server in response to the sensor data request. When no previously or newly identified events are found, then the sensor data request is ignored by the sensor. When the second waiting period expires, the central server destroys all bidirectional links for sensors to which a request for additional sensor data was sent, and data verification is once again carried out on the acoustic collection to verify that the originating acoustic alert was not already used in a localization process and that the remaining number of unused acoustic alerts in the collection is sufficient to carry out source localization. At this point, if there is still not enough data to perform source localization, then the acoustic collection is removed from the acoustic collection storage structure, and no further processing is carried out on the acoustic collection. If there is enough data to perform source localization, processing of the acoustic collection continues, as discussed below.

Acoustic Sensor Fusion and Source Localization

In some embodiments, the central server applies an acoustic source localization algorithm to an acoustic collection after the waiting period in data acquisition for the acoustic collection has expired, enough acoustic alerts were received to successfully carry out the source localization algorithm, any requests for additional sensor data to be included in the acoustic collection have been transmitted, and any subsequent waiting period in additional data acquisition for the acoustic collection has also expired. As noted above, a source localization algorithm is used to verify the presence and determine the geographic location of an acoustic event of interest. A source localization algorithm or process is described in U.S. Pat. No. 10,871,548, for example.

In some embodiments, before starting a source localization process for the acoustic collection, the central server once again iterates through the acoustic alerts referenced in the acoustic collection and removes any that have been marked as already used based on their associated utilization flags. When enough data remains to perform acoustic source localization and the originating alert also remains unused at this time, then the central server subjects the acoustic collection to a source localization process for determination of the source location of the acoustic event. Otherwise, the acoustic collection is simply removed from the acoustic collection storage structure, and no further processing is carried out.

As an acoustic alert can belong to multiple acoustic collections, the status of the acoustic alert, which could be reflected in the utilization flag, should be determined through the source localization of only one acoustic collection at a time. In some embodiments, the central server thus ensures that only one localization process is carried out at a time using a global locking mechanism and that an acoustic collection is not altered while it is being used by a localization process using an individual locking mechanism.

In some embodiments, for the global locking mechanism, a call to acquire the global mutex lock can be made as soon as an acoustic collection passes all data acquisition phases and is about to enter the source localization phase. The acoustic collection attempting to acquire the global mutex lock is blocked until the global mutex lock is released by another thread that may have acquired the global mutex lock previously. The global mutex lock is released by its locking thread as soon as the corresponding source localization process has completed. As such, an acoustic collection that is ready to enter the source localization phase always waits until an existing source localization process is completed.

In some embodiments, for the individual locking mechanism, at the start of any source localization process for an acoustic collection, an individual mutex lock on the acoustic collection is also acquired and never released, such that additional acoustic alerts will not be added to the acoustic collection during or after its source localization process. The combination of the two locks ensures that no two localization processes occur at the same time, each acoustic collection continues to accumulate sensor data until its corresponding source localization process begins, and incoming acoustic alerts do not disrupt or alter an existing acoustic collection that has already been processed or is currently being processed.

In some embodiments, the steps outlined above help increase the efficiency of executing a continuous stream of source localization processes by limiting the inputs for each process to only those acoustic alerts that are potentially relevant to the acoustic event being processed, and by ensuring that a process is able to start as soon as enough sensor data has been acquired to do so, while allowing for the possibility of requesting additional sensor data and maintaining data consistency across disparate acoustic collections that may share references to the same acoustic alerts. Additionally, since every acoustic alert will have a corresponding acoustic collection in which it is the originating acoustic alert, it is straightforward to reject an originating acoustic alert of a certain acoustic collection and thus the corresponding acoustic event as erroneous without affecting the source localization results of other acoustic alerts when no consistent source location can be found for the certain acoustic collection. Depending on the source localization algorithm employed, estimates of the resulting location accuracy may also be used to accept or reject an originating acoustic alert based on how imprecise or erroneous its corresponding location is determined to be.

Data Cleanup and Results Processing

In some embodiments, when the source localization process for an acoustic collection is completed, the utilization flag is set to true for all constituent acoustic alerts that were actually used to produce a source location estimate. At that time, the acoustic collection can be removed from the acoustic collection storage structure. While an acoustic collection contains references to all received acoustic alerts that could feasibly correspond to a single acoustic event, some of these acoustic alerts may not actually correspond to that single acoustic event and thus would not have been useful in the source localization process. Therefore, it is possible that only some of the acoustic alerts in the acoustic collection are marked as used after source localization. Also, since only a reference to the original acoustic alert is stored in each acoustic collection, any changes to the utilization flag associated with an acoustic alert during one source localization process are immediately visible to all other acoustic collections containing a reference to the same acoustic alert.

In some embodiments, when an acoustic collection is removed from the acoustic collection storage structure, all of the references it contains to existing acoustic alerts are removed, and the acoustic collection is destroyed. When the last remaining reference to an acoustic alert is removed from any existing acoustic collection, indicating that the acoustic alert is no longer relevant to any additional acoustic collections, that acoustic alert can be destructed, become no longer available, and its memory allocations can be freed.

5. Example Processes

FIG. 6 illustrates an example process performed by the audio management system. FIG. 6 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 602, the audio management system is programmed to receive acoustic alerts from the plurality of sensing devices through unidirectional communication links. An acoustic alert of the acoustic alerts has information related to a sensing device of the plurality of sensing devices from which the acoustic alert was received and an acoustic event detected by the sensing device, and the acoustic alert is received in real time relative to detection of the acoustic event.

In one embodiment, a sensing device of the plurality of sensing devices is an audio sensor or an input device comprising one or more audio sensors. In another embodiment, the information related to the sensing device includes coordinates or the elevation of the sensing device. In yet another embodiment, the information related to the acoustic event includes a timestamp of an onset of the acoustic event or a type of audio in the acoustic event.

In some embodiments, in step 604, the audio management system is programmed to create an acoustic collection for each acoustic alert of the acoustic alerts including the acoustic alert and adding subsequently received acoustic alerts that satisfy a first set of criteria to the acoustic collection.

In one embodiment, the first set of criteria includes being a subsequently received acoustic alert being received within a first period of time from when the acoustic alert was received, a subsequently received acoustic alert being within a second period of time from the acoustic alert in terms of onset times of corresponding acoustic events, or the subsequently received acoustic alert being received from a separate sensing device that is geometrically related to a sensing device from which the acoustic alert was received based on a separate set of criteria. In another embodiment, the separate set of criteria includes the separate sensing device being within a certain distance away from the sensing device or having an orientation within a range of orientations relative to the sensing device.

In some embodiments, in step 606, the audio management system is programmed to determine, in an order of acoustic collection creation, whether a specific acoustic collection of the created acoustic collections satisfies a second set of criteria for identifying a location of a specific acoustic event.

In one embodiment, the second set of criteria includes a number of acoustic alerts in the specific acoustic collection reaching a threshold.

In one embodiment, the audio management system is programmed further to assign a global lock to the specific acoustic collection, the global lock configured to disallow identifying the location of a separate acoustic event based on acoustic alerts in a separate acoustic collection.

In one embodiment, the audio management system is programmed further to assign an individual lock to the specific acoustic collection, the individual lock configured to disallow adding, removing, or updating acoustic alerts in the specific acoustic collection.

In one embodiment, the creating step comprises storing references to the acoustic alerts in the specific acoustic collection in association with the specific acoustic collection, and the determining step is performed by a specific programming thread for the specific acoustic collection.

In some embodiments, in step 608, the audio management system is programmed to, when the specific acoustic collection is determined not to satisfy the second set of criteria, create a bidirectional communication link for the specific acoustic collection with one or more sensing devices of the plurality of sensing devices and send a request for acoustic alerts to the one or more sensing devices through the bidirectional communication link. In other embodiments, the request indicates a direction to relax criteria for searching raw audio data and generating acoustic alerts.

In one embodiment, the one or more sensing devices are located within a geographic region centered around a certain sensing device, the acoustic alert for which the specific acoustic collection was created being received from the certain sensing device.

In one embodiment, the audio management system is programmed further to receive additional acoustic alerts in response to the request through the bidirectional communication link and add the additional acoustic alerts that satisfy a third set of criteria to the specific acoustic collection.

In one embodiment, the third set of criteria includes an additional acoustic alert of the additional acoustic alerts being received within a period of time from when the request was sent, and the audio management system is programmed further to destroy the bidirectional communication link at an end of the period of time.

In one embodiment, the audio management system is programmed further to determine whether the specific acoustic collection satisfies the second set of criteria, and when the specific acoustic collection is determined not to satisfy the second set of criteria, discard the specific acoustic collection.

In some embodiments, in step 610, the audio management system is programmed to, when the specific acoustic collection is determined to satisfy the second set of criteria, identify the location of the specific acoustic event based on acoustic alerts in the specific acoustic collection; remove the acoustic alerts in the specific acoustic collection from other created acoustic collections; and transmit information related to the location to a client device.

In some embodiments, the audio management system is programmed further to estimate an accuracy of the identified location and discard the specific acoustic collection without transmitting any information to the client device when the estimated accuracy is below a threshold.

6. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
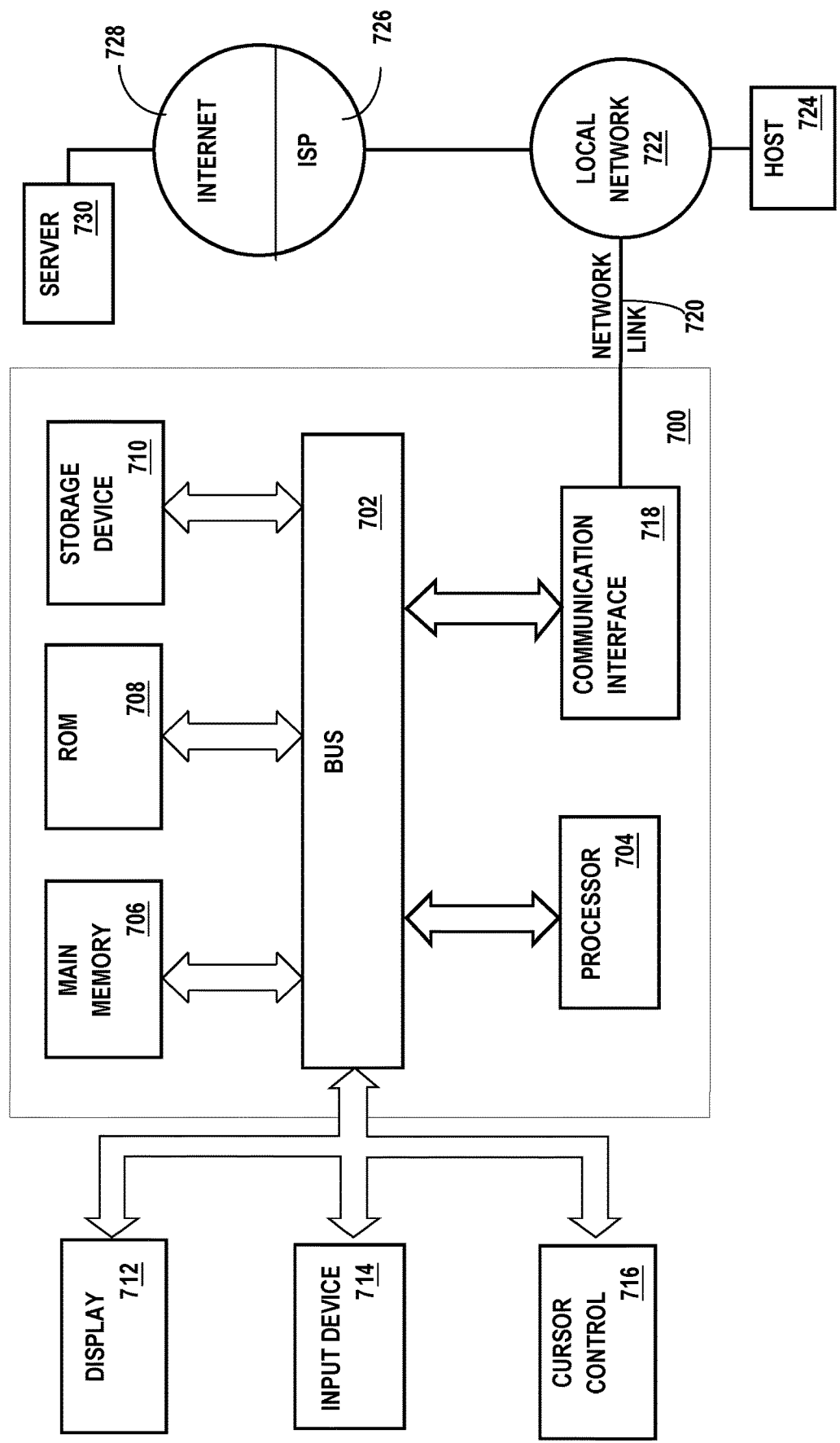
FIG. 7 is a block diagram that illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of determining a location of an acoustic event, comprising:

receiving, by a processor, acoustic alerts from the plurality of sensing devices through unidirectional communication links, an acoustic alert of the acoustic alerts having information related to a sensing device of the plurality of sensing devices from which the acoustic alert was received and an acoustic event detected by the sensing device, the acoustic alert being received in real time relative to detection of the acoustic event;

creating, by the processor, an acoustic collection for each acoustic alert of the acoustic alerts including the acoustic alert and adding subsequently received acoustic alerts that satisfy a first set of criteria to the acoustic collection;

determining, in an order of acoustic collection creation, whether a specific acoustic collection of the created acoustic collections satisfies a second set of criteria for identifying a location of a specific acoustic event;

when the specific acoustic collection is determined not to satisfy the second set of criteria, creating a bidirectional communication link for the specific acoustic collection with one or more sensing devices of the plurality of sensing devices; and sending a request for acoustic alerts to the one or more sensing devices through the bidirectional communication link;

when the specific acoustic collection is determined to satisfy the second set of criteria, identifying the location of the specific acoustic event based on acoustic alerts in the specific acoustic collection;

removing the acoustic alerts in the specific acoustic collection from other created acoustic collections; and transmitting information related to the location to a client device.

2. The computer-implemented method of claim 1, a sensing device of the plurality of sensing devices being an audio sensor or an input device comprising one or more audio sensors.

3. The computer-implemented method of claim 1, the information related to the sensing device including coordinates or elevation of the sensing device.

4. The computer-implemented method of claim 1, the information related to the acoustic event including a timestamp of an onset of the acoustic event or a type of audio in the acoustic event.

5. The computer-implemented method of claim 1, the first set of criteria including being a subsequently received acoustic alert being received within a first period of time from when the acoustic alert was received, a subsequently received acoustic alert being within a second period of time from the acoustic alert in terms of onset times of corresponding acoustic events, or the subsequently received acoustic alert being received from a separate sensing device that is geometrically related to a sensing device from which the acoustic alert was received based on a separate set of criteria.

6. The computer-implemented method of claim 5, the separate set of criteria including the separate sensing device being within a certain distance away from the sensing device or having an orientation within a range of orientations relative to the sensing device.

7. The computer-implemented method of claim 1, the second set of criteria including a number of acoustic alerts in the specific acoustic collection reaching a threshold.

8. The computer-implemented method of claim 1, when the specific acoustic collection is determined not to satisfy the second set of criteria, further comprising:

receiving additional acoustic alerts in response to the request through the bidirectional communication link;

adding the additional acoustic alerts that satisfy a third set of criteria to the specific acoustic collection.

9. The computer-implemented method of claim 8, the third set of criteria including an additional acoustic alert of the additional acoustic alerts being received within a period of time from when the request was sent, the computer-implemented method further comprising destroying the bidirectional communication link at an end of the period of time.

10. The computer-implemented method of claim 8, when the specific acoustic collection is determined not to satisfy the second set of criteria further comprising:

determining whether the specific acoustic collection satisfies the second set of criteria;

when the specific acoustic collection is determined not to satisfy the second set of criteria, discarding the specific acoustic collection.

11. The computer-implemented method of claim 1, the one or more sensing devices being located within a geographic region centered around a certain sensing device, the acoustic alert for which the specific acoustic collection was created being received from the certain sensing device.

12. The computer-implemented method of claim 1, the request indicating a direction to relax criteria for searching raw audio data and generating acoustic alerts.

13. The computer-implemented method of claim 1, when the specific acoustic collection is determined to satisfy the second set of criteria, further comprising assigning a global lock to the specific acoustic collection, the global lock configured to disallow identifying a location of a separate acoustic event based on acoustic alerts in a separate acoustic collection.

14. The computer-implemented method of claim 1, when the specific acoustic collection is determined to satisfy the second set of criteria, further comprising assigning an individual lock to the specific acoustic collection, the individual lock configured to disallow adding, removing, or updating acoustic alerts in the specific acoustic collection.

15. The computer-implemented method of claim 1, the creating comprising storing references to the acoustic alerts in the specific acoustic collection in association with the specific acoustic collection, the determining being performed by a specific programming thread for the specific acoustic collection.

16. The computer-implemented method of claim 1, when the specific acoustic collection is determined to satisfy the second set of criteria, further comprising:

estimating an accuracy of the identified location;

discarding the specific acoustic collection without transmitting any information to the client device when the estimated accuracy is below a threshold.

17. One or more non-transitory computer-readable media storing one or more sequences of instructions which when executed using one or more processors cause the one or more processors to execute a method of determining time-based onsets of impulsive acoustic events, the method comprising:

receiving acoustic alerts from the plurality of sensing devices through unidirectional communication links, an acoustic alert of the acoustic alerts having information related to a sensing device of the plurality of sensing devices from which the acoustic alert was received and an acoustic event detected by the sensing device, the acoustic alert being received in real time relative to detection of the acoustic event;

creating an acoustic collection for each acoustic alert of the acoustic alerts including the acoustic alert and adding subsequently received acoustic alerts that satisfy a first set of criteria to the acoustic collection;

determining, in an order of acoustic collection creation, whether a specific acoustic collection of the created acoustic collections satisfies a second set of criteria for identifying a location of a specific acoustic event;

when the specific acoustic collection is determined not to satisfy the second set of criteria, creating a bidirectional communication link for the specific acoustic collection with one or more sensing devices of the plurality of sensing devices; and sending a request for acoustic alerts to the one or more sensing devices through the bidirectional communication link;

when the specific acoustic collection is determined to satisfy the second set of criteria, identifying the location of the specific acoustic event based on acoustic alerts in the specific acoustic collection;

removing the acoustic alerts in the specific acoustic collection from other created acoustic collections; and transmitting information related to the location to a client device.

18. A system for determining time-based onsets of impulsive acoustic events, comprising:

one or more memories;

one or more processors coupled to the one or more memories and configured to perform:

receiving acoustic alerts from the plurality of sensing devices through unidirectional communication links, an acoustic alert of the acoustic alerts having information related to a sensing device of the plurality of sensing devices from which the acoustic alert was received and an acoustic event detected by the sensing device, the acoustic alert being received in real time relative to detection of the acoustic event;

creating an acoustic collection for each acoustic alert of the acoustic alerts including the acoustic alert and adding subsequently received acoustic alerts that satisfy a first set of criteria to the acoustic collection;

determining, in an order of acoustic collection creation, whether a specific acoustic collection of the created acoustic collections satisfies a second set of criteria for identifying a location of a specific acoustic event;

when the specific acoustic collection is determined not to satisfy the second set of criteria, creating a bidirectional communication link for the specific acoustic collection with one or more sensing devices of the plurality of sensing devices; and sending a request for acoustic alerts to the one or more sensing devices through the bidirectional communication link;

when the specific acoustic collection is determined to satisfy the second set of criteria, identifying the location of the specific acoustic event based on acoustic alerts in the specific acoustic collection;

removing the acoustic alerts in the specific acoustic collection from other created acoustic collections; and transmitting information related to the location to a client device.

\* \* \* \* \*